(12) United States Patent
Knox et al.

(10) Patent No.: US 7,673,539 B2
(45) Date of Patent: Mar. 9, 2010

(54) SERVICEABLE SEAL FOR TRANSFER CASE

(75) Inventors: Thomas P. Knox, Wiesloch (DE); Christopher E. Blair, Waterford, MI (US)

(73) Assignee: BorgWarner, Inc., Auburn Hills, MI (US)

(*) Notice: Subject to any disclaimer, the term of this patent is extended or adjusted under 35 U.S.C. 154(b) by 1145 days.

(21) Appl. No.: 11/048,603

(22) Filed: Feb. 1, 2005

(65) Prior Publication Data
US 2005/0188784 A1  Sep. 1, 2005

Related U.S. Application Data

(60) Provisional application No. 60/544,648, filed on Feb. 13, 2004.

(51) Int. Cl.
*F16H 57/02* (2006.01)
*F16H 57/04* (2006.01)
*F16H 61/00* (2006.01)
*B60B 27/00* (2006.01)

(52) U.S. Cl. .................. 74/606 R; 74/607; 184/6.12; 184/11.1; 301/108.4

(58) Field of Classification Search .............. 74/606 R, 74/607; 301/108.4; 418/61.3; 184/11.1, 184/6.12; 475/198
See application file for complete search history.

(56) References Cited

U.S. PATENT DOCUMENTS

| | | | |
|---|---|---|---|
| 1,983,955 A * | 12/1934 | Von Soden-Fraunhofen | 475/198 |
| 2,226,388 A | 12/1940 | Richter | |
| 2,536,385 A * | 1/1951 | Miller | 184/11.1 |
| 3,110,095 A | 11/1963 | Peickii | |
| 3,862,672 A | 1/1975 | Tappen et al. | |
| 4,218,813 A | 8/1980 | Cather, Jr. | |
| 4,343,601 A * | 8/1982 | Thorson | 418/61.3 |
| 4,630,506 A | 12/1986 | Allmandinger et al. | |
| 4,815,884 A | 3/1989 | Halliday, Jr. et al. | |
| 4,877,370 A | 10/1989 | Nakagawa et al. | |
| 5,052,695 A | 10/1991 | Curtis | |
| 5,505,525 A * | 4/1996 | Denton | 301/108.4 |
| 6,374,700 B1 | 4/2002 | Jarzyna | |
| 6,662,684 B1 | 12/2003 | Krisher | |
| 6,983,673 B2 * | 1/2006 | Bellich et al. | 74/606 R |
| 6,983,999 B2 * | 1/2006 | Goettker | 301/108.4 |
| 7,178,425 B2 * | 2/2007 | Marich | 74/607 |

* cited by examiner

*Primary Examiner*—Vinh T. Luong
(74) *Attorney, Agent, or Firm*—Warn Partners, P.C.

(57) ABSTRACT

An arrangement and method for removing a shaft from a gearbox housing without having to totally disassemble the housing. The gear box has an aperture in the housing. The aperture is used to gain access to the retaining ring that locks the shaft within the housing. Once the retaining ring is removed, the shaft may then slide out of the housing. A plug member is used to cover the aperture when it is not necessary to remove the shaft.

9 Claims, 5 Drawing Sheets

SERVICEABLE SEAL FOR TRANSFER CASE

CROSS-REFERENCE TO RELATED APPLICATIONS

This application claims the benefit of U.S. Provisional Application No. 60/544,648, filed Feb. 13, 2004.

FIELD OF THE INVENTION

The present invention relates to a gearbox arrangement for removing a shaft from a housing without having to disassemble the entire housing.

BACKGROUND OF THE INVENTION

There are two output shaft arrangements that are generally used in transfer case arrangements. They are one-piece and two-piece output shafts. Each have their own distinct advantages and disadvantages. The one-piece output shaft provides good radial runout performance and is economical to manufacture. However, the seal that extends between the shaft and the transfer case housing can only be serviced after the output shaft is completely disassembled from the transfer case. The second type of output shaft arrangement is the two-piece shaft. This type of arrangement allows for external seal servicing, but has poor radial runout performance and is more costly than a one-piece shaft. Thus it is more desirable to use a one-piece shaft because it is more cost efficient and it provides better run out performance. However external seal servicing is a significant drawback that will often limit how often one-piece shafts are used in transfer case applications. Therefore, it is an object of the present invention to provide gearbox arrangements that permit a one-piece shaft to be easily removed from a housing for seal service. Thus, significantly shortening the time consuming process of disassembling the output shaft form the transfer case in order to service the seal.

SUMMARY OF THE INVENTION

The present invention is directed to a gearbox arrangement having a serviceable seal. The gearbox arrangement has a housing with a shaft having a first end in the housing and a second end positioned outside of the housing. Inside of the housing there is a sprocket that is splined to the shaft. At the point where the shaft leaves the housing there is a seal that prevents exposure of the inside of the housing to the external environment. At times it is necessary for the seal to be serviced. In order for this to take place it will be necessary to remove the shaft from the housing. The present invention is directed to various gearbox arrangements for releasing the shaft from the housing without disassembling the entire housing. The invention includes a means for uncoupling the shaft from the gearbox to allow the shaft to slide axially outside of the housing. In particular, there are two means for doing this which include the compressible retaining ring arrangement and the plug and aperture arrangement. The two gearbox arrangements described herein are the compressible retaining ring gearbox arrangement and the plug and aperture gearbox arrangement. Both gearbox arrangements ease the burden of removing the shaft from the housing by eliminating the arduous task of disassembling the entire housing.

With respect to the compressible retaining ring arrangement, a portion of the shaft located inside the housing has a groove circumscribing the shaft. Inside of the groove a compressible retaining ring is placed that holds the shaft in place to prevent a shaft from sliding axially outside of the housing. To remove the shaft from the housing, a sufficient amount of axial force is applied to the shaft in order to compress the compressible retaining ring. A second groove inside of the sprocket has a ramped or tapered surface that aids in the compression of the retaining ring by allowing the retaining ring to slide along the ramped surface. Once the retaining ring compresses the shaft can slide axially out of the housing.

A second plug and aperture arrangement incorporates an aperture formed through the wall of the housing that is adjacent to the end of the shaft that terminates inside of the housing. Located near the end of the shaft inside of the housing is a retaining ring that prevents the shaft from sliding axially out of the housing. The retaining ring can be removed via the aperture, thus allowing the shaft to be removed from the housing. A removable plug member is configured to seal off the aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
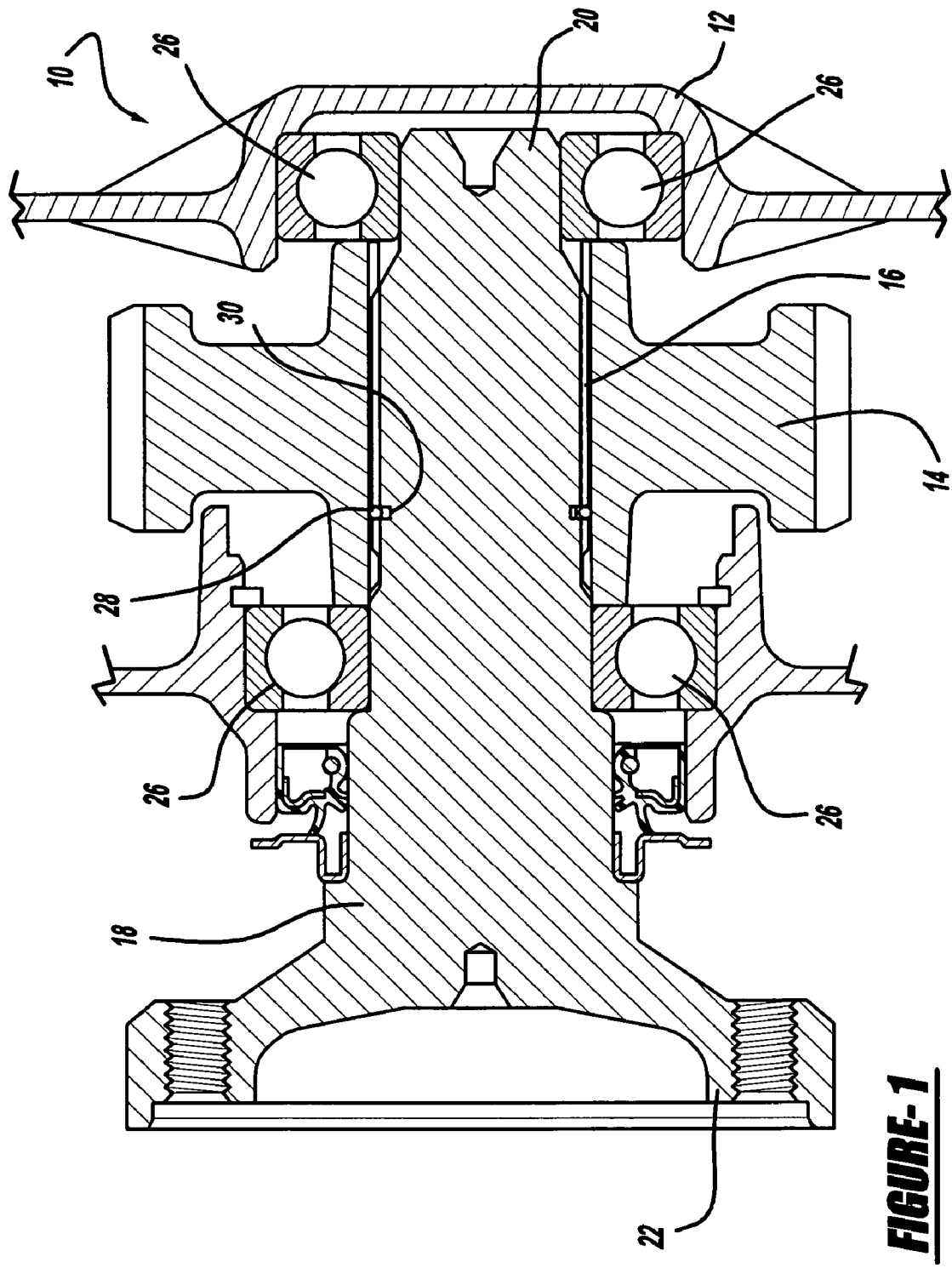
FIG. 1 is a cross-sectional plan view of a gearbox housing having an output shaft inserted using the compressible retaining ring embodiment of the invention.

FIG. 1 depicts a cross-sectional view of the compressible retaining ring embodiment of the invention incorporated in a gearbox 10. The gearbox arrangement 10 has a housing 12 that contains a sprocket 14 having splines 16 that are connected with splines on a shaft 18. The embodiments of the invention shown in FIG. 1 depict the gearbox arrangement 10 as a transfer case having a shaft 18 that is a one-piece front output shaft of a transfer case. However, it is also possible for the shaft 18 to be an input shaft, an axle or a transmission output shaft depending on where the invention is being incorporated. The housing 12 can be a transfer case housing or any other portion of the vehicle drive train that incorporates the use of seals that close off the housing 12 to the outside environment. For example, the housing 12 could also be a differential or transmission housing.

The shaft 18 has a first end 20 that terminates inside of the housing 12. The portion of the shaft 18 located inside of the housing 12 is suspended by ball bearings 26 that allow the shaft 18 to rotate about its radial axis. A second end 22 is located outside of the housing, forming what is referred to as the flanged section of the shaft 18. The second end of the shaft 22 interfaces with a shaft coupling (constant velocity joint, universal joint, etc.).

A retaining ring 28 is disposed around the radial surface of the shaft 18 that is located inside of the housing 12. The retaining ring 28 is arranged inside of a first groove 30 that is located on the radial surface of the shaft 18. The retaining ring 28 serves the purpose of holding a portion of the shaft 18 within the housing 12. In particular, the retaining ring 28 is located on the region of the shaft 18 that is aligned with the splines 16 of the sprocket 14. As shown in further detail on FIG. 2, the retaining ring 28 will align with a second groove 32 that extends perpendicular across the spline 16 of the sprocket 14 and is parallel to the first groove 30.

Figure 2:
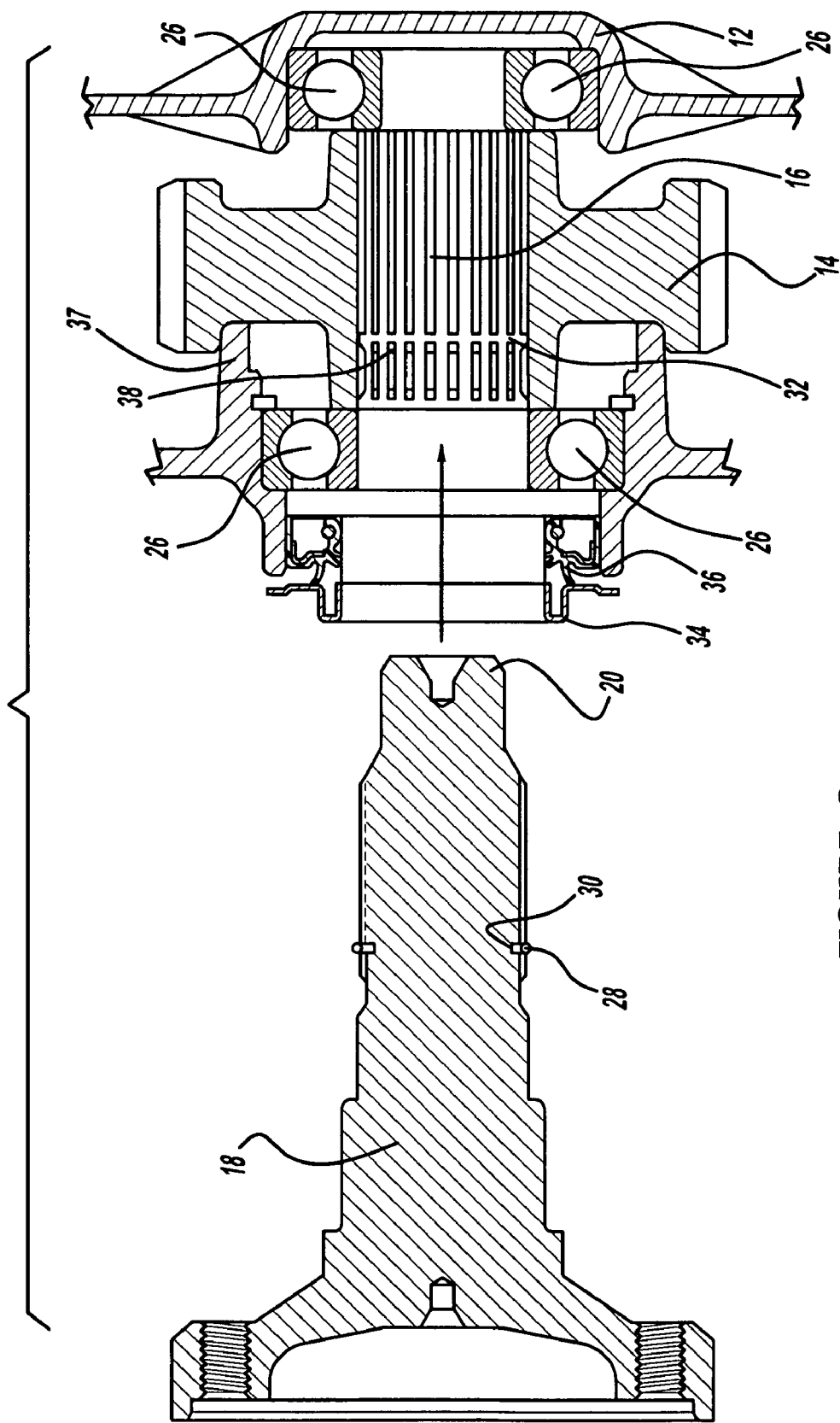
FIG. 2 depicts the same view as FIG. 1, wherein the output shaft is shown outside of the housing prior to installation.
Figure 3:
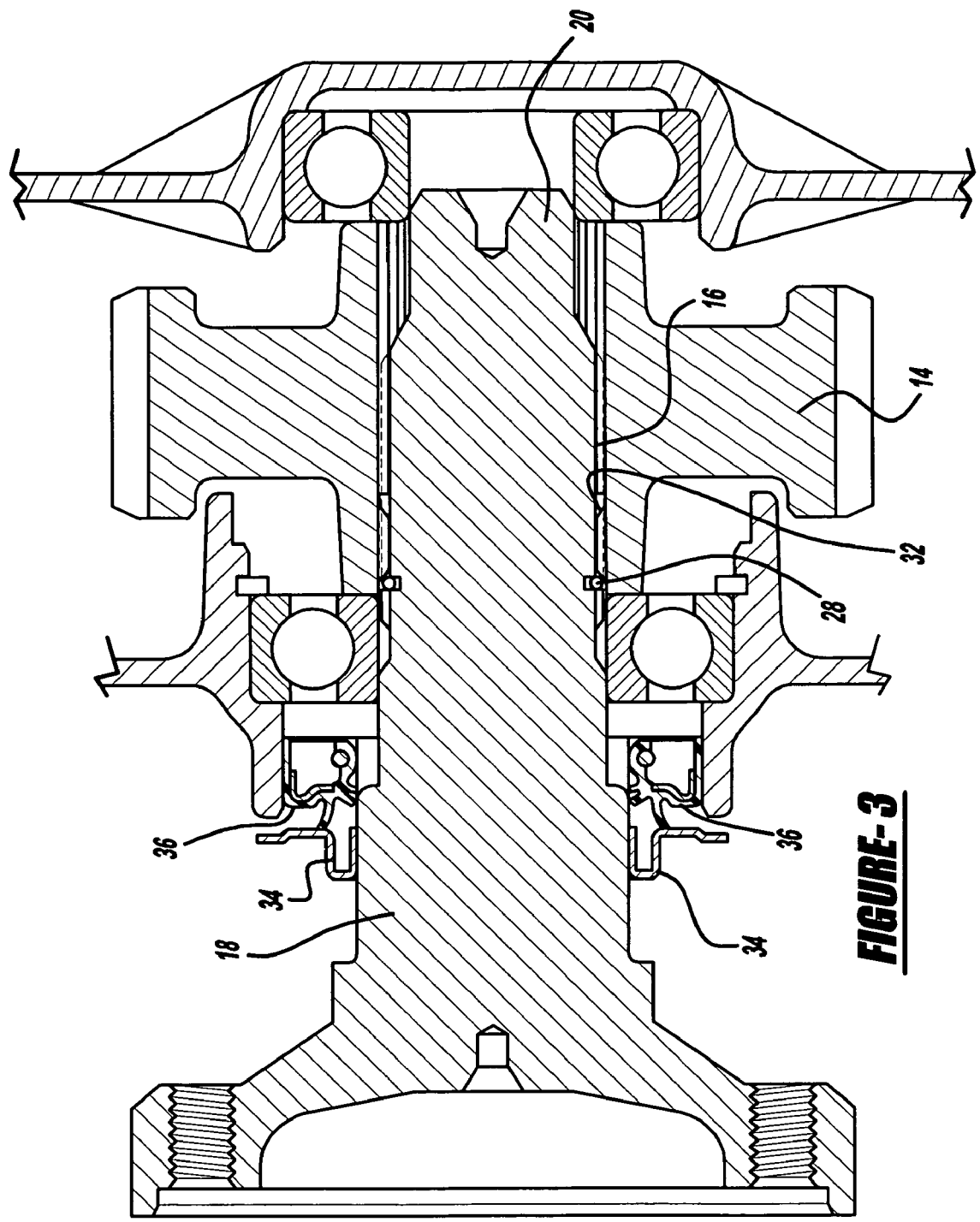
FIG. 3 shows the same view as FIGS. 1 and 2 showing the output shaft partially inserted inside of the gearbox housing at an intermediate stage of the installation.

FIG. 2 shows the shaft 18 located outside of the housing 12, while FIG. 3 shows the shaft 18 inside the housing during installation. During installation of the shaft 18, force is applied along the longitudinal axis of the shaft 18 in order to slide a portion of the shaft 18 into the housing 12. During insertion of the shaft 18, the retaining ring 28 will compress into the first groove 30 until the first end of the shaft 20 is inserted to the correct depth. The shaft 18 has been inserted into the correct depth when the retaining ring 28 is aligned with the second groove 32, thus allowing the retaining ring 28 to expand into the second groove 32. At this point, the shaft 18 will be locked into place within the housing 12.

The seal 34 is configured to circumscribe the shaft 18. During installation, the shaft 18 will be inserted through a seal 34 and garter spring 36 arrangement. The seal 34 functions to close off the housing 12 from the outside environment in order to prevent fluid within the housing 12 from leaking out, as well as to protect the inside of the housing 12 from the outside environment. During the lifetime of the vehicle it can be necessary to replace the seal 34 when it becomes cracked or deteriorates. In order to service the seal 34 it is often necessary to remove the shaft 18 from the housing 12. In most vehicle applications the gearbox 10 will contain lubricating fluids such as oil. Thus it is desirable for the method of carrying out the invention to include the step of draining lubricating fluids from the housing 12 in a conventional manner. The next step entails applying a sufficient amount of force along the longitudinal axis of the shaft 18 in a direction that moves the first end of the shaft 20 outside of the housing 12. The second groove 32 on the sprocket 14 has a ramped edge 38 that helps slide the retaining ring 28 out of the second groove 32 and compress the retaining ring 28 into the first groove 30. Once the retaining ring is compressed 28 the shaft 18 can then be removed by simply pulling the shaft 18 out of the housing 12. The amount of force required to remove the shaft 18 for seal 34 servicing is significantly greater than the forces encountered by the shaft during normal operation of the gearbox arrangement 10. The seal 34 can then be serviced. The shaft 18 can then be reinstalled following the same steps that were described for the installation of the shaft 18.

When the shaft 18 is removed from the housing 12 the sprocket 14 is prevented from moving axially with the shaft 18 during removal by the roller bearing 26. When the shaft 18 is removed the sprocket 14 will rest against an annular shoulder 37 formed by the housing 12 in order to prevent the sprocket 14 from moving laterally. This ensures that when the shaft 18 is reinserted into the housing 12 the sprocket 14 will not be misaligned.

Figure 4:
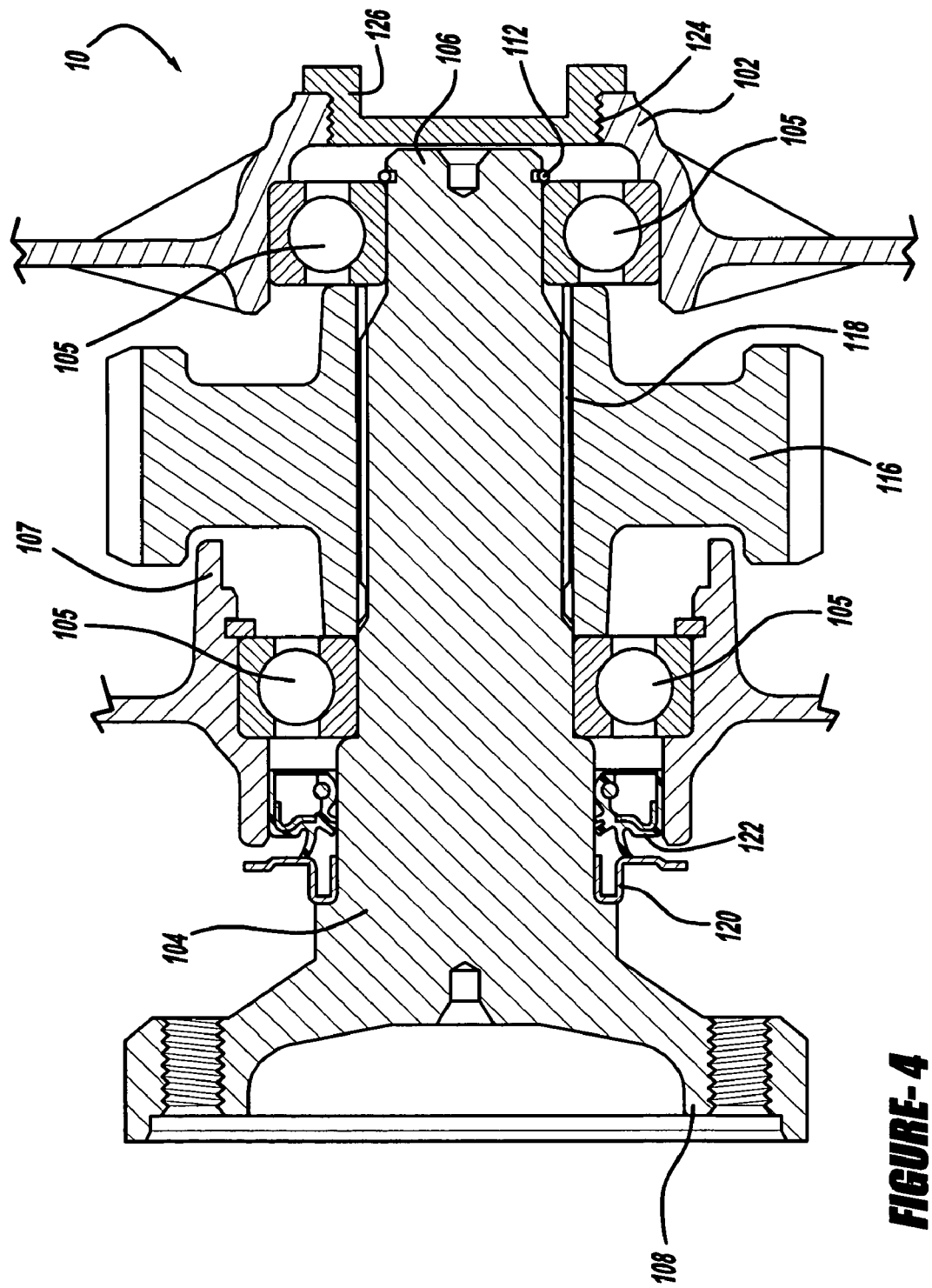
FIG. 4 shows a cross-sectional plan view of a gearbox housing having an aperture formed in the wall of the gearbox housing to allow access to disengage the output shaft.
Figure 5:
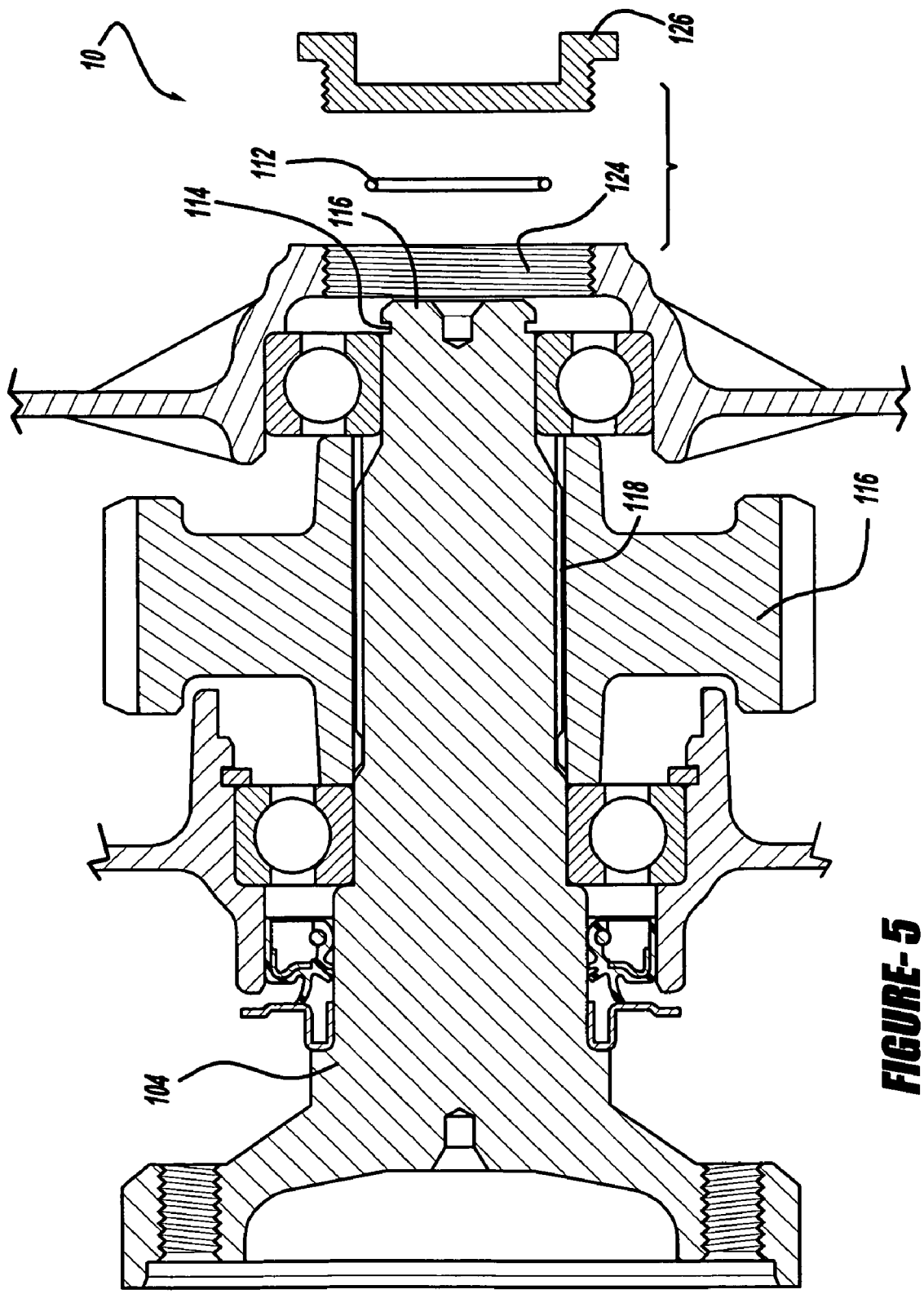
FIG. 5 is an exploded cross-sectional plan view of the embodiment shown in FIG. 4.

A second embodiment of the invention can be seen in FIGS. 4 and 5. This particular embodiment is directed to a gearbox arrangement 10 having a housing 102. The housing 102 in this particular embodiment can be a transfer case housing or any other configuration on a vehicle that must be sealed from the outside environment. For example, the housing 102 could also be a transmission housing or front or rear differential. A shaft 104 has first end of the shaft 106 that terminates inside of the housing 102. A second end 108 of the shaft 104 terminates outside of the housing 102 and forms a flanged section of the shaft 104. The second end 108 of the shaft 104 interfaces with a shaft coupling (constant velocity joint, universal joint, etc.). In the present invention the shaft 104 is a one-piece front output shaft of a transfer case. However, the shaft 104 can consist of more than one piece. Additionally, the shaft 104 can also be a different kind of shaft such as a rear output shaft, an input shaft, an axle or a transmission output shaft depending on the particular gearbox arrangement 10. In order to permit the shaft 104 to rotate freely within the housing 102, the portion of the shaft 104 located inside of the housing 102 is suspended by ball bearings 105 that allow the shaft 104 to rotate about its radial axis.

Adjacent the first end 106 of the shaft 104 is a retaining ring 112 which is connected to the shaft 104 at a groove 114 on the shaft 104. The retaining ring 112 functions to hold a portion of the shaft 104 within the housing 102 during vehicle operations by preventing the shaft 104 from sliding axially out of the housing 102. Inside of the housing 102, a sprocket 116 has splines 118 that interact with splines radially disposed about a portion of the shaft 104. The housing 102 also has a seal 120 and garter spring 122 that functions to seal the housing 102 from the outside environment. The seal 120 circumscribes a portion of the shaft 104 where the shaft 104 extends outside of the housing 102.

In order to remove the shaft 104 from the housing 102 in the event that the seal 120 needs to be serviced, the housing 102 has an aperture 124 located near the first end 106 of the shaft 104 and the retaining ring 112. The aperture 124 can be used to drain lubricating fluids such as oil from the housing 102. It is also possible to remove the lubricating fluids by other conventional methods known to those having ordinary skill in the art. The aperture 124 also functions to provide access for removal of the retaining ring 112 from the groove 114 on the shaft 104. Once the retaining ring 112 has been removed, the shaft 104 can slide along its longitudinal axis out of the housing by pulling the shaft in a direction toward the second end 108. A plug member 126 is disposed within the aperture in order to seal the housing 102 when it is not necessary to remove the shaft 104. The plug 126 functions to contain fluids within the housing 102 while at the same time preventing contaminants from the outside environment from entering through the aperture 124. When the shaft 104 is inserted into the housing 102 the retaining ring 112 can be placed in the groove 114 through the aperture 124. Once the shaft 104 has been secured, the aperture 124 can be covered using the plug 126. The plug 126 can also be press fit to the housing, or it can be attached with fasteners or adhesives. FIGS. 4-5 depict a threaded plug 126 that is configured to be threaded onto threads on the sides of the aperture 124. However, it is possible for any suitable plug configuration to be used that will seal the aperture 124 so it will not leak or allow contaminants into the housing 102.

When the shaft 104 is removed from the housing 102 the sprocket 116 is prevented from moving axially with the shaft 114 during removed by the roller bearings 105. When the shaft 104 is removed the sprocket 116 will rest against an annular shoulder 107 formed by the housing 102 in order to prevent the sprocket 116 from moving laterally. This ensures that when the shaft 104 is reinserted into the housing 102 the sprocket 116 will not be misaligned.

The compressible retaining ring arrangement and the plug and aperture arrangement both describe a means for uncoupling the shaft from the gearbox arrangement to allow the shaft to slide axially outside of the housing of the gearbox arrangement.

The description of the invention is merely exemplary in nature and, thus, variations that do not depart from the scope of the invention are intended to be within the scope of the invention. Such variations are not to be regarded as a departure from the spirit and scope of the invention.

What is claimed is:

1. A transfer case arrangement having a seal comprising:
    a transfer case housing;
    a shaft having a first end inside of said transfer case housing and a second end positioned outside of said transfer case housing;
    a retaining ring circumscribing said shaft inside of said transfer case housing, wherein said retaining ring is positioned to secure said shaft and prevent axial movement of the shaft;
    an aperture formed through a wall of said housing positioned axially adjacent to said first end of said shaft located inside of said transfer case housing, wherein said aperture provides access to said retaining ring connected to said shaft located inside of said transfer case housing;
    a plug member configured to sealingly close off said aperture;
    a sprocket splined to said shaft located inside of said transfer case housing;
    an annular shoulder of said transfer case housing formed inside of said transfer case housing, said annular shoulder positioned adjacent said sprocket and configured to contact and prevent said sprocket from moving in said transfer case housing when said shaft is disconnected from said sprocket; and
    said seal extends between said housing and engages and circumscribes said shaft, wherein when said sprocket is disconnected from said shaft said shaft slides out of engagement with said seal allowing said seal to be serviced.

2. The gearbox of claim 1 further comprising one or more bearings adjacent each side of said sprocket, wherein said one or more bearings prevent said sprocket from moving along a longitudinal axis of said shaft.

3. The gearbox of claim 1 further comprising a seal located at a region where the shaft enters the housing, wherein the seal circumscribes said shaft and extends between said housing and said shaft.

4. The gearbox of claim 1 wherein said housing is a transfer case housing.

5. The gearbox of claim 4 wherein said shaft is a front output shaft.

6. The gearbox of claim 4 wherein the shaft is a rear output shaft.

7. The gear box of claim 1 further comprising said annular shoulder contacting said sprocket and preventing said sprocket from moving axially with said shaft when said shaft is removed from said transfer case housing and said annular shoulder holds said sprocket in an aligned position upon removal of said shaft and upon reinsertion of said shaft said sprocket in said shaft are in alignment.

8. A transfer case housing having a seal comprising:
    a transfer case housing;
    a shaft having a first end in said housing and a second end positional outside of said transfer case housing;
    a retaining ring connected to said shaft, wherein said retaining ring couples said shaft to a sprocket of said transfer case housing to prevent said shaft from sliding axially outside of said transfer case housing;
    a means for uncoupling said shaft from said housing to allow said shaft to slide axially outside of said transfer case housing;
    an annular shoulder of said transfer case housing formed inside of said transfer case housing, said annular shoulder positioned adjacent said sprocket and configured to contact and prevent said sprocket from moving in said transfer case housing when said shaft is disconnected from said sprocket said seal extends between said housing and engages and circumscribes said shaft, wherein when said sprocket is disconnected from said shaft said shaft slides out of engagement with said seal allowing said seal to be serviced.

9. The gear box of claim 8 further comprising said annular shoulder contacting said sprocket and preventing said sprocket from moving axially with said shaft when said shaft is removed from said transfer case housing and said annular shoulder holds said sprocket in an aligned position upon removal of said shaft and upon reinsertion of said shaft said sprocket in said shaft are in alignment.

* * * * *